United States Patent [19]

Bauer

[11] Patent Number: 4,888,035
[45] Date of Patent: Dec. 19, 1989

[54] PROCESS AND APPARATUS FOR SEPARATION OF A GASEOUS MIXTURE

[75] Inventor: Heinz Bauer, Munich, Fed. Rep. of Germany

[73] Assignee: Linde Akteingesellschaft, Wiesbaden, Fed. Rep. of Germany

[21] Appl. No.: 274,562

[22] Filed: Nov. 23, 1988

[30] Foreign Application Priority Data

Nov. 24, 1987 [DE] Fed. Rep. of Germany ....... 3739724

[51] Int. Cl.$^4$ .................................................. F25J 3/00
[52] U.S. Cl. .......................................... 62/20; 55/68; 62/24
[58] Field of Search ..................... 62/20, 23, 24; 55/68

[56] References Cited

U.S. PATENT DOCUMENTS

| | | | |
|---|---|---|---|
| 4,462,814 | 7/1984 | Holmes et al. | 62/20 |
| 4,563,202 | 1/1986 | Yao et al. | 62/20 |
| 4,654,062 | 3/1987 | Gottier | 62/20 |
| 4,692,179 | 9/1987 | Mehra | 62/20 |
| 4,696,688 | 9/1987 | Mehra | 62/20 |

OTHER PUBLICATIONS

R. Fabian, "Present State of Cryogenic $H_2$/CO Separation", *Linde Reports on Science and Technology*, 38/1984, pp. 37–41.

*Primary Examiner*—Ronald C. Capossela
*Attorney, Agent, or Firm*—Millen, White & Zelano

[57] ABSTRACT

The disclosure relates to a process as well as an apparatus for the separation of a gaseous mixture containing essentially hydrogen, methane and carbon monoxide, wherein the gaseous mixture is subjected to a physical low-temperature scrubbing step with liquid methane, as well as to subsequent separation of $H_2$ from the loaded methane by means of stripping and/or expansion and subsequent regeneration of the loaded methane by CO/$CH_4$ separation. In order to minimize the losses of CO, encountered during $H_2$ separation and/or in order to raise the yield of CO, the $H_2$ gas obtained during the stripping and/or expansion step is brought into contact with liquid methane.

17 Claims, 1 Drawing Sheet

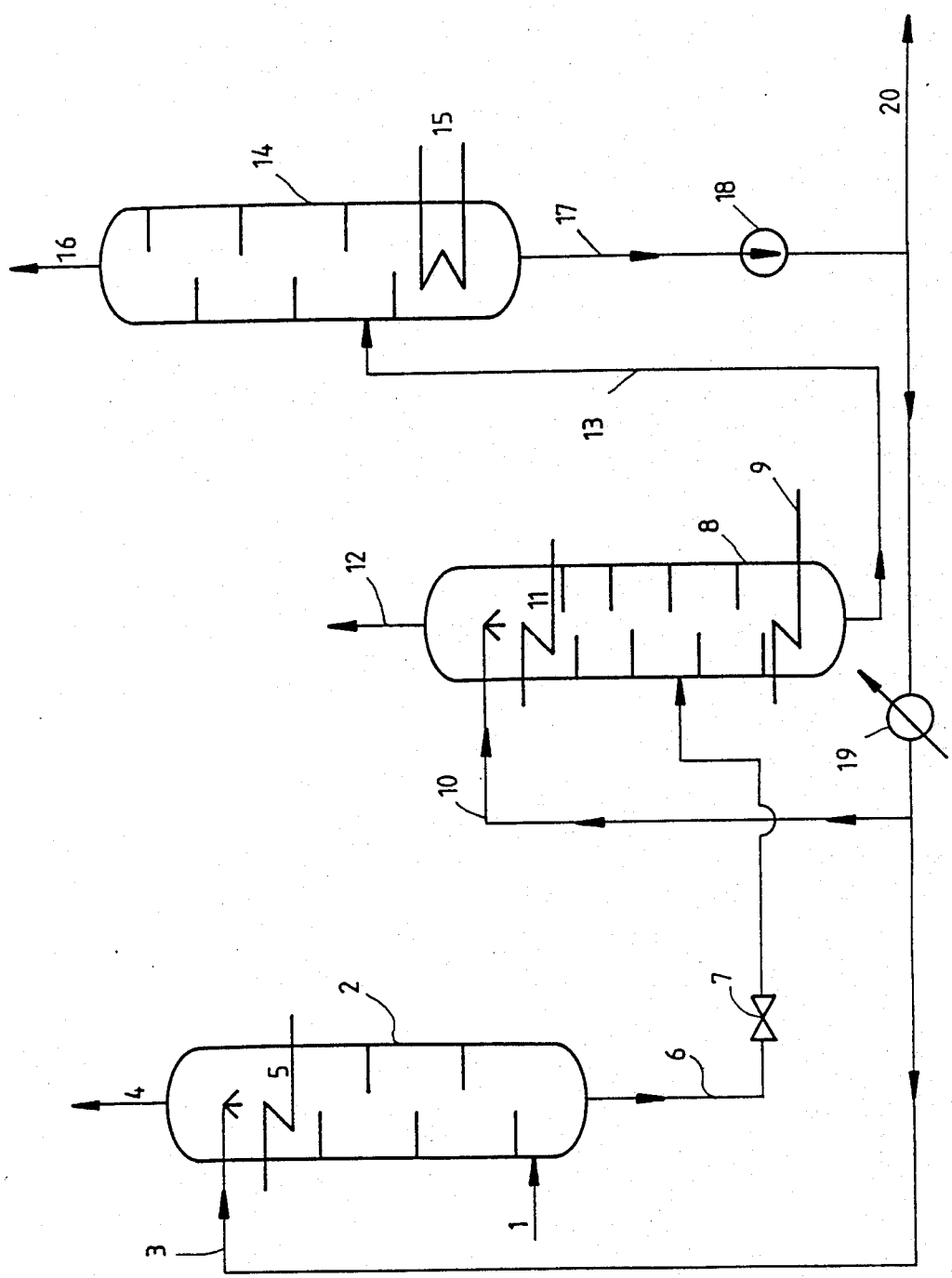

PROCESS AND APPARATUS FOR SEPARATION OF A GASEOUS MIXTURE

BACKGROUND OF THE INVENTION

The invention relates generally to a system for the separation of gaseous mixtures containing essentially hydrogen ($H_2$), methane ($CH_4$) and carbon monoxide (CO) especially purified CO. Such a system generally comprises a physical low-temperature scrubbing step employing liquid methane as the scrubbing agent, as well as a downstream stripping and/or expansion step to separate $H_2$ from the loaded methane, and thereafter a regeneration step to separate the loaded methane into enriched CO and $CH_4$ fractions.

In a conventional process of this type ("Linde Reports on Science and Technology" No. 38, 1984, pages 37-47), carbon monoxide is scrubbed out at a low temperature in a scrubbing column by means of liquid methane from a crude gas, such as, for example, steam reformer gas, and $H_2$ is withdrawn overhead from the scrubbing column. In order to obtain carbon monoxide as produce, CO is separated from methane in a regeneration column, for example by rectification, and the thus-purified $CH_4$ is recycled into the scrubbing column. However, since a product CO of maximum purity is desired, the $H_2$ content is reduced in a further process step, provided upstream of the regeneration, wherein the loaded methane from the scrubbing column is expanded and introduced into a stripping column. In this step, hydrogen, still contaminated with 20-60 mol-% of CO and 0.5-5 mol-% of $CH_4$ is released. As contrasted with a mere expansion in an expansion tank, the stripping column is provided with heating means to evolve the contaminated hydrogen.

The proportion of CO remaining in the hydrogen represents, with regard to the yield of product CO, a loss of up to 10%, which has an adverse effect on the economy of the process. Typical yields of CO in the known process range from 94 to 97%.

Accordingly, in the conventional process, the yield of product CO is less than desired.

SUMMARY OF THE INVENTION

An object of this invention is to provide a process of the type discussed hereinabove and associated apparatus, wherein separation of the gaseous mixture leads to an increased yield of CO, while simultaneously minimizing the losses of CO in the $H_2$ stripper and/or an expansion tank.

Upon further study of the specification and appended claims, further objects and advantages of this invention will become apparent to those skilled in the art.

These objects are attained according to this invention by bringing the gas obtained during expansion and/or stripping into contact with liquid methane.

The invention is based on the concept that the Co discharged with the $H_2$ stream during expansion and/or, respectively, stripping represents substantially the sole source of losses in the process, since, on account of the low temperatures in the scrubbing column, all of the CO from the crude gas except for a few ppm is dissolved in the $CH_4$. Furthermore, in the regeneration column, due to the designed bottoms temperature, CO remains dissolved in the regenerated methane only within the ppm range.

Advantageously, the gas obtained during expansion and/or stripping is brought into contact with a partial stream of regenerated methane whereby the additional expenditure for apparatus as compared with the conventional process is kept at a minimum. Also, during operation at less than design capacity, it is usually impossible, or uneconomical, to throttle the fluid flow in the cycle effecting the $CO/CH_4$ separation ($N_2$, CO, etc.). Therefore, in this way, with a partial-load operation of, for example, 90% full capacity, any excess regenerated methane from the bottom of the $CO/CH_4$ column can be beneficially utilized.

It proved to be especially advantageous in regard to the yield of CO to bring the thus-obtained gas into contact with about 5-15%, preferably 7-10%, of the regenerated methane.

Losses of scrubbing medium by $CH_4$ discharged together with the $H_2$ and CO product streams are compensated for by the $CH_4$ in the gaseous mixture proper which is to be separated. For example, when using a steam reformer gas, the latter contains between 2 and 10 mol-% of $CH_4$, which is substantially more than the amount of losses. It is thus usually necessary to purge a portion of regeneration methane from the cycle to prevent a buildup of same.

In order to attain a maximally complete scrubbing out of the carbon monoxide from the gaseous mixture to be separated as well as from the gas released during expansion and/or stripping, it is preferred to utilize liquid methane having a temperature of about $-182°$ to $-173°$ C., especially $-181°$ to $-178°$ C.

Moreover, it proved to be extraordinarily advantageous to effect cooling during expansion and/or stripping, thus obtaining a maximally complete removal of the heat of solution.

Furthermore, the step of bringing the gas obtained during expansion and/or stripping into contact with regenerated methane is carried out in a preferred way in at least 3 and preferably 3 to 10 theoretical equilibrium stages.

The invention moreover concerns an apparatus for performing the process, comprising a scrubbing column and a regenerating column with an interposed stripping column and/or expansion tank. In a preferred embodiment of the apparatus according to this invention, the scrubbing and regenerating columns are joined by way of a conduit for regenerated methane leading from the bottom of the regenerating column to the head of the scrubbing column. Furthermore, according to the invention, the stripping column and/or the expansion tank are connected with the regenerating column by way of a branch conduit of the conduit for regenerated methane, leading to the head of the stripping column and/or of the expansion tank, and by way of a conduit for partially loaded methane connected to the bottom of the stripping column and/or expansion tank. In addition, the stripping column and/or the expansion tank contain, in the lower part, an inlet for loaded methane in communication with the bottom of the scrubbing column. In this way, a substantial reduction of the CO losses is attained by rescrubbing.

Another advantageous embodiment of the invention contains the feature that there are installed, in the expansion tank and/or in the stripping column, plates and/or, at the head, a cooling trap or cooling coil. Likewise, according to this invention, the individual plates can also in each case be designed as beds of packing elements. These additionally provided features bring about a reduction of the requirement for scrubbing medium and, respectively, $CH_4$ at a given yield of CO to be achieved, and thus also result in lowering of the operating costs.

In total, the invention provides the advantage that yields of CO higher than about 99% can be attained thereby.

The invention is usable in all processes for separating gaseous mixtures consisting essentially of $H_2$, $CH_4$ and CO, such as, in particular, steam reformer gas. Of course, the invention can also treat other gaseous mixtures containing still further, inert gas components, such as, for example, nitrogen, argon or helium. These components then will occur in the individual gaseous streams in correspondence with their solution or condensation characteristics, without altering the course of the process according to this invention.

In the process according to the invention, the stripping column is generally operated at a pressure of about 2 to 20 bar, preferably 3 to 10 bar, and at a head temperature of generally about $-185°$ to $-160°$ C. and a bottom temperature of about $-170°$ to $-140°$ C. The gaseous and liquid streams generally have the following concentration of components

| mol % | two phase Feed (b) | liquid Feed (70) | overhead Stream (22) | Bottom stream (13) |
|---|---|---|---|---|
| $H_2$ | 1–3 | — | 60–95 | 0.00007–0.07 |
| $N_2$ | 0–5 | — | 0–10 | 0–3 |
| CO | 20–40 | 0.00007–0.07 | 1–10 | 20–35 |
| $CH_4$ | 60–80 | 99.99–100 | 1–10 | 65–85 |

This range of composition is also valid for an expansion tank coupled with a contact column.

The entire text of all applications, patents and publications, if any, cited above and below, and of corresponding German application P 37 39 724.9 (the priority document), are hereby incorporated by reference.

BRIEF DESCRIPTION OF THE DRAWINGS

Various other objects, features and attendant advantages of the present invention will be more fully appreciated as the same becomes better understood when considered in conjunction with the accompanying drawing wherein:

FIG. 1 is a schematic illustration of both the process and apparatus aspects of the embodiment in which the loaded methane is subjected to both expansion and stripping.

DETAILED DESCRIPTION

In accordance with FIG. 1, crude gas is fed under high pressure (20 bar) and at $-181°$ C. via conduit 1 into the lower section of a scrubbing column 2. The crude gas consists of 70 mol% hydrogen, 22 mol% carbon monoxide, and 5 mol% methane, as well as a residual proportion of 3 mol% inert gases.

The rising crude gas is scrubbed herein with purified, low-temperature $CH_4$ conducted counter-currently and introduced via conduit 3 at the head of the scrubbing column 2. During this step, the CO is dissolved in the $CH_4$, and the hydrogen is withdrawn via conduit 4 as a first product from the head of the scrubbing column 2 and passed on to further usages (not illustrated). This hydrogen still contains about 1.5 mol% $CH_4$ as well as CO and inert gases in the ppm range.

In order to remove CO most efficiently by scrubbing, liquid methane is utilized at $-180°$ C., and the resultant heat of solution is removed by means of a cooling trap 5, which is in most cases are indirect heat exchanges fed with $N_2$ or CO in liquid form.

The lowest temperature of the methane employed is limited by the methane solidification point. (The melting point of pure methane is $-182.5°$ C.)

From the bottom of the scrubbing column 2, by means of conduit 6 and valve 7 wherein expansion is performed to an intermediate pressure of 5 bar, CO-loaded scrubbing medium and, respectively, methane still containing additionally about 4 mol% $H_2$, are removed and introduced into an $H_2$ stripper 8 containing, for example, 12 theoretical plates, at between the 5th and 6th theoretical plates. A heating coil 9 to produce the stripping vapor is provided in the bottom of $H_2$ stripper 8.

Via conduit 10, purified methane at a temperature of $-180°$ C. is introduced at the head of the $H_2$ stripper 8. This methane, thus recycled, scrubs out CO that has remained in the $H_2$ released during the stripping step. In order to enhance the efficacy of the scrubbing step and/or for reducing the amount of scrubbing medium required, a cooling trap 11 is arranged below the $CH_4$ feed point.

An $H_2$ fraction with 93.8 mol% $H_2$, 3.0 mol% $CH_4$ and 3.0 mol% CO, as well as residual inert gases is withdrawn via conduit 12 from the head of the $H_2$ stripper 8.

The methane (39.6 mol% CO, 59.8 mol% $CH_4$), presently loaded practically only with CO, is conducted from the bottom of the stripper 8 via conduit 13 at a temperature of $-165°$ C. and a pressure of 2 bar to a regenerating or rectifying column 14 equipped with a indirect heating means 15, e.g., a heating coil, in the bottom. By means of heating means 15, a temperature of $-153°$ C. is set in the bottom.

At the end of rectification, the CO product is withdrawn via conduit 16. In this case, the yield of CO is 99.7%.

The regenerated methane is brought, from the bottom of the rectifying column 14 via conduit 17 by means of a pump 18 to crude gas pressure and cooled in a heat exchanger 19 to crude gas temperature. Thereafter, the regenerated methane is recycled into the scrubbing and stripping operations via conduits 3 and 10, respectively.

In order to preclude enrichment of the methane or any inert gases in the scrubbing medium cycle, a partial stream of the purified methane is continuously removed by way of conduit 20.

If the concentration of $H_2$ in the CO product may be up to 0.1–0.5 vol% the stripping section of column 8 (section underneath the feed point) may be omitted. This results in a lower bottom temperature of $-180°$ to $-150°$ C. and a higher $H_2$ concentration of 0.05 to 0.3 vol%. The absorber section (above feed point) remains unchanged.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for separating a gaseous mixture containing essentially hydrogen, methane and carbon monoxide comprising:
   (a) scrubbing said gaseous mixture in a physical low-temperature scrubbing step using liquid methane as the scrubbing medium
   (b) separating $H_2$ and CO from loaded methane discharged from said scrubbing step (a) in a separation step, and
   (c) thereafter regenerating said loaded methane in a regeneration step wherein said loaded methane is separated into enriched CO and $CH_4$ fractions, the improvement wherein
   said $H_2$ and CO gas obtained during said separation step (b) is brought into contact with regenerated liquid methane to recover CO therefrom, resulting in an increased overall yield of CO.

2. A process according to claim 1, wherein the loaded methane is subjected to both expansion and stripping during said separation step (a) to produce said $H_2$ gas which is brought into contact with liquid methane.

3. A process aaccording to claim 2, wherein gas obtained by expansion and stripping is brought into contact with a partial amount of regenerated methane.

4. A process according to claim 3, wherein gas obtained by expansion and stripping is brought into contact with about 5-15% of the regenerated methane.

5. A process according to claim 2, wherein indirect cooling of the liquid methane is provided during both expansion and stripping.

6. A process according to claim 2, wherein the loaded methane is expanded upstream of a stripping step.

7. A process according to claim 1, wherein liquid methane at about $-182°$ to $-173°$ C. is used during scrubbing step (a) and during said contacting of the gas obtained in separation step (b).

8. A process according to claim 7, wherein liquid methane about $-181°$ C. to $-178°$ C. is used during scrubbing and contacting the gas obtained by expansion and/or stripping.

9. A process according to claim 1, wherein contacting of the gas obtained during separation step (b) with liquid methane is conducted in a vessel having at least three theoretical equilibrium stages.

10. A process according to claim 1, wherein after being contacted with liquid methane, said $H_2$ gas obtained during separation step (b) is discharged from the process as a product stream.

11. A process according to claim 1, wherein following regeneration step (c), a portion of the regenerated methane is discharged from the process to prevent enrichment of the methane, aand the remainder of the regenerated methane is cooled in a heat exchanger and then divided into a first stream and a second stream, said first stream being delivered directly to separation step (b) and said second stream being delivered directly to scrubbing step (a).

12. An apparatus for performing a process for separating a gaseous mixture containing essentially hydrogen, methane and carbon monoxide comprising:
   a scrubbing column and a regenerating column with interposed stripping column or expansion tank, wherein the scrubbing and regenerating columns are joined by a first conduit for regenerated methane leading from the bottom of the regenerating column to the head of the scrubbing column;
   said stripping column or expansion tank being connected with the regenerating column by way of a branch conduit of the first conduit for regenerated methane, leading to the head of the stripping column or expansion tank, and by way of a second conduit for partially loaded methane which is connected to the bottom of the stripping column or expansion tank; and
   the stripping column or expansion tank contains, in the lower part, an inlet for loaded methane in communication with the bottom of the scrubbing column.

13. An apparatus according to claim 12, further comprising plates installed in the expansion tank or stripping column.

14. An apparatus according to claim 12, further comprising a cooling coil installed in the expansion tank or stripping column.

15. An apparatus according to claim 13, wherein said plates constitute beds of packing elements.

16. An apparatus according to claim 13, wherein a heating coil is installed in the bottom of the stripping column.

17. An apparatus according to claim 12, wherein a stripping column is interposed between the scrubbing and regenerating columns and an expansion means is positioned upstream of the inlet for loaded methane communicating with the bottom of the scrubbing column.

* * * * *